(12) United States Patent
Higano et al.

(10) Patent No.: US 11,137,635 B2
(45) Date of Patent: Oct. 5, 2021

(54) DISPLAY DEVICE INCLUDING AN ADHESIVE LAYER AND A NON-ADHESIVE LAYER

(71) Applicant: Japan Display Inc., Minato-ku (JP)

(72) Inventors: Emi Higano, Tokyo (JP); Toshiyuki Higano, Tokyo (JP); Shigesumi Araki, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/529,958

(22) Filed: Aug. 2, 2019

(65) Prior Publication Data

US 2020/0050055 A1 Feb. 13, 2020

(30) Foreign Application Priority Data

Aug. 13, 2018 (JP) .............................. JP2018-152338

(51) Int. Cl.
  *G02F 1/1335* (2006.01)
  *G02F 1/1333* (2006.01)
  *G02F 1/1343* (2006.01)

(52) U.S. Cl.
  CPC .................. *G02F 1/133528* (2013.01); *G02F 1/133305* (2013.01); *G02F 1/133514* (2013.01); *G02F 1/134309* (2013.01); *G02F 2202/28* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 2011/0069030 | A1* | 3/2011 | Nozawa | G06F 3/045 345/173 |
| 2015/0146386 | A1* | 5/2015 | Namkung | G02F 1/133305 361/749 |
| 2017/0278899 | A1* | 9/2017 | Yang | H01L 51/0097 |
| 2019/0072811 | A1 | 3/2019 | Higano et al. | |
| 2019/0094610 | A1 | 3/2019 | Yukawa et al. | |

FOREIGN PATENT DOCUMENTS

| | | | |
|---|---|---|---|
| CN | 10-7065055 | * 10/2000 | ........... G02B 5/3033 |
| JP | 10-054981 A | 2/1998 | |
| JP | 2011-017970 A | 1/2011 | |
| JP | 2019-045763 A | 3/2019 | |
| JP | 2019-060906 A | 4/2019 | |

\* cited by examiner

*Primary Examiner* — Lauren Nguyen

(74) *Attorney, Agent, or Firm* — Oblon, McClelland, Maier & Neustadt, L.L.P.

(57) ABSTRACT

According to one embodiment, a display device includes a display panel including a display area which displays images, a non-display area surrounding the display area, and a bend area in the non-display area, a first optical film located on the display panel and comprising an end portion which overlaps the bend area, an adhesive layer which adheres the first optical film and the display panel together and a non-adhesive layer located between the first optical film and the display panel, while overlapping the bend area, wherein the non-adhesive layer is in contact with an upper surface of the display panel.

15 Claims, 7 Drawing Sheets

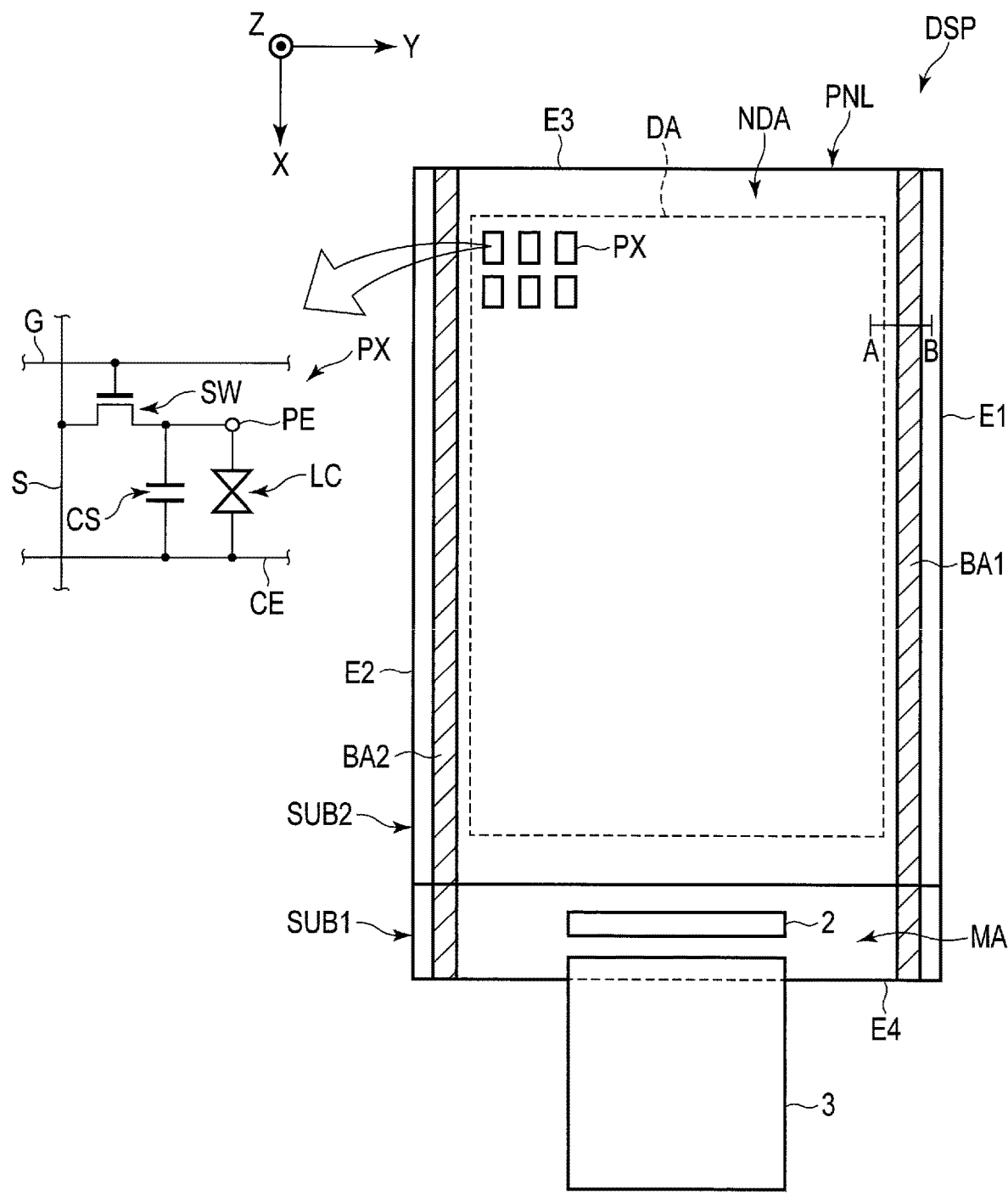
F I G. 1

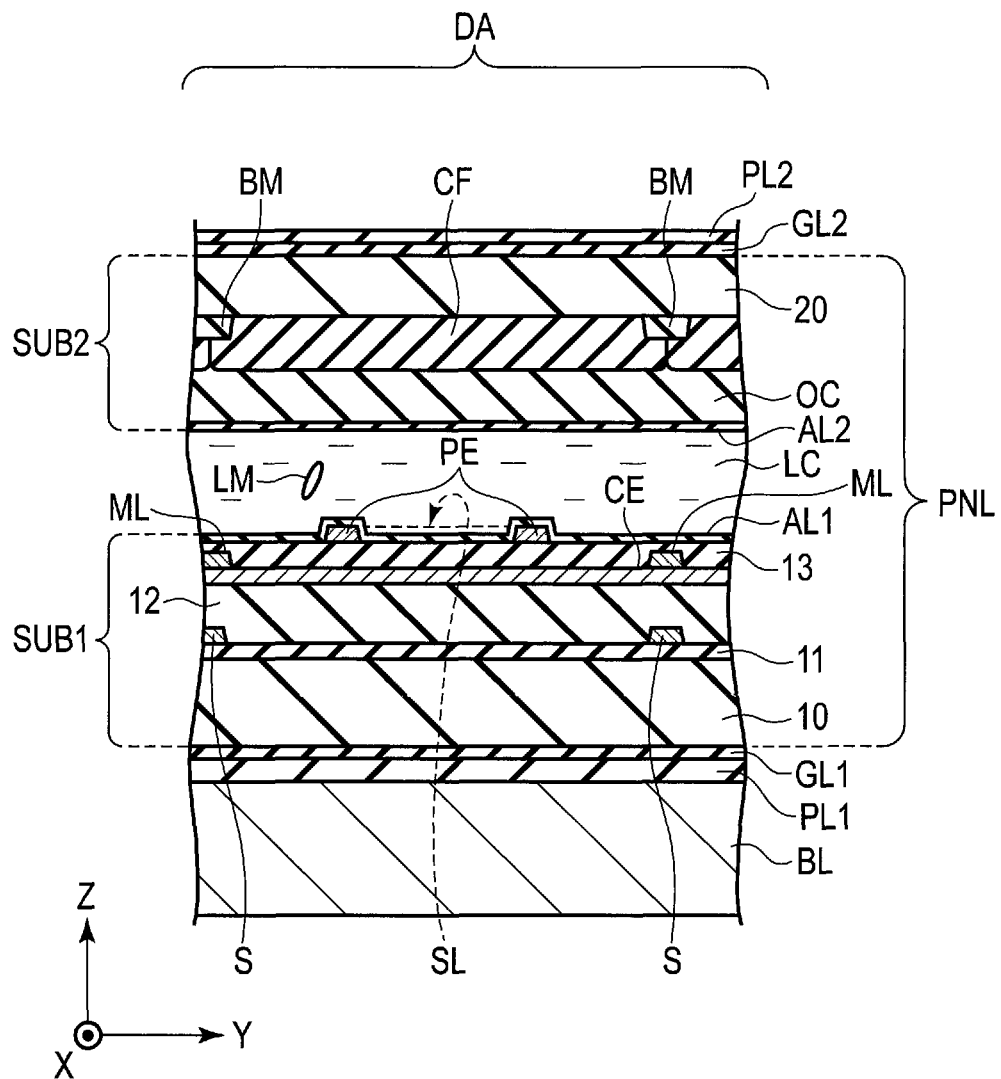
F I G. 2

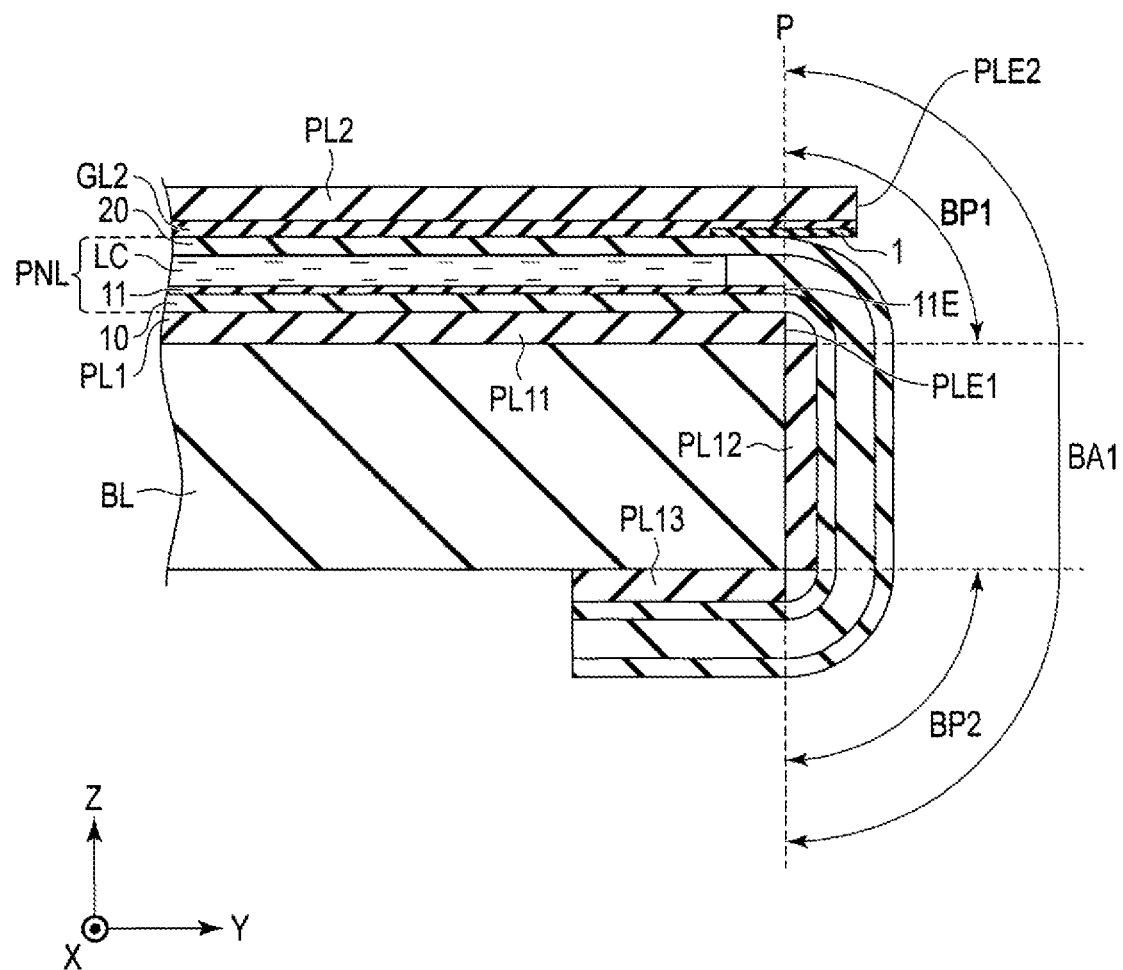
F I G. 4

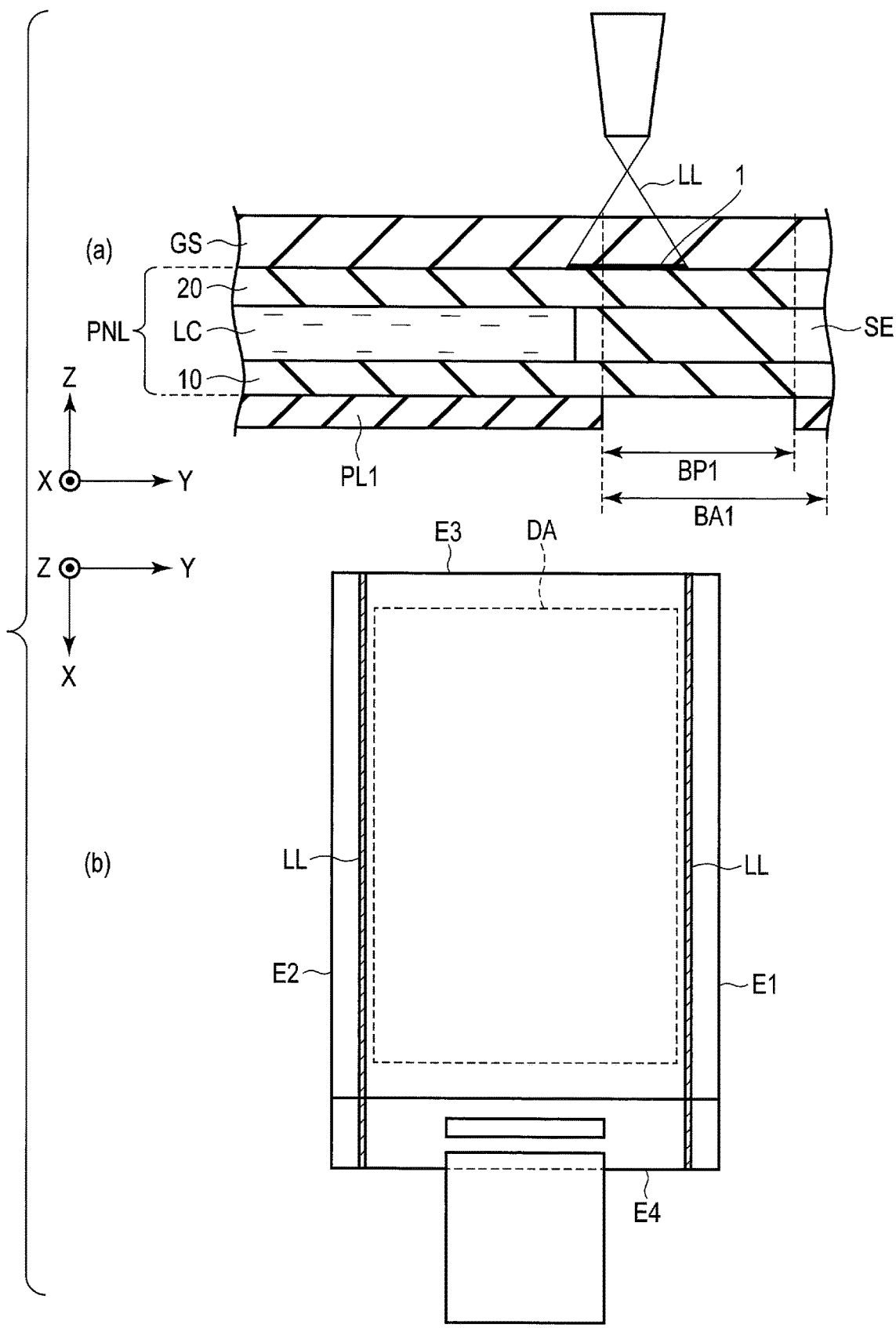
F I G. 5

DISPLAY DEVICE INCLUDING AN ADHESIVE LAYER AND A NON-ADHESIVE LAYER

CROSS-REFERENCE TO RELATED APPLICATIONS

This application is based upon and claims the benefit of priority from Japanese Patent Application No. 2018-152338, filed Aug. 13, 2018, the entire contents of which are incorporated herein by reference.

FIELD

Embodiments described herein relate generally to a display device.

BACKGROUND

Display devices such as liquid crystal displays comprise a polarizer disposed, for example, to cover the display area. The polarizer is adhered on the substrate via an adhesive layer. Here, for example, in order to suppress warping of the display panel, which may be caused by contraction of the polarizer, there is a conventionally known technology which forms non-adhesive portions sporadically in the adhesive layer.

Moreover, in attaching a polarizer on a display panel, the separator attached on the polarizer is removed to expose the adhesive, and then the polarizer is adhered onto the panel. Here, in order to decrease charge to be generated when peeling a separator off from a polarizer, such a technique is known that a release-process region where a separator and an adhesive are not attached together is formed in a central portion of the polarizer, thus reducing the removing area of the separator.

BRIEF DESCRIPTION OF THE DRAWINGS

FIG. 1 is a diagram showing a structure and an equivalent circuit of a display device of this embodiment.
FIG. 2 is a cross section showing a display area of a display panel shown in FIG. 1.
FIG. 4 is a cross section showing a bent region of the display panel shown in FIG. 3, when it is bent.
FIG. 5 is a diagram illustrating a step of preparing a non-adhesive layer.

DETAILED DESCRIPTION

Figure 3:
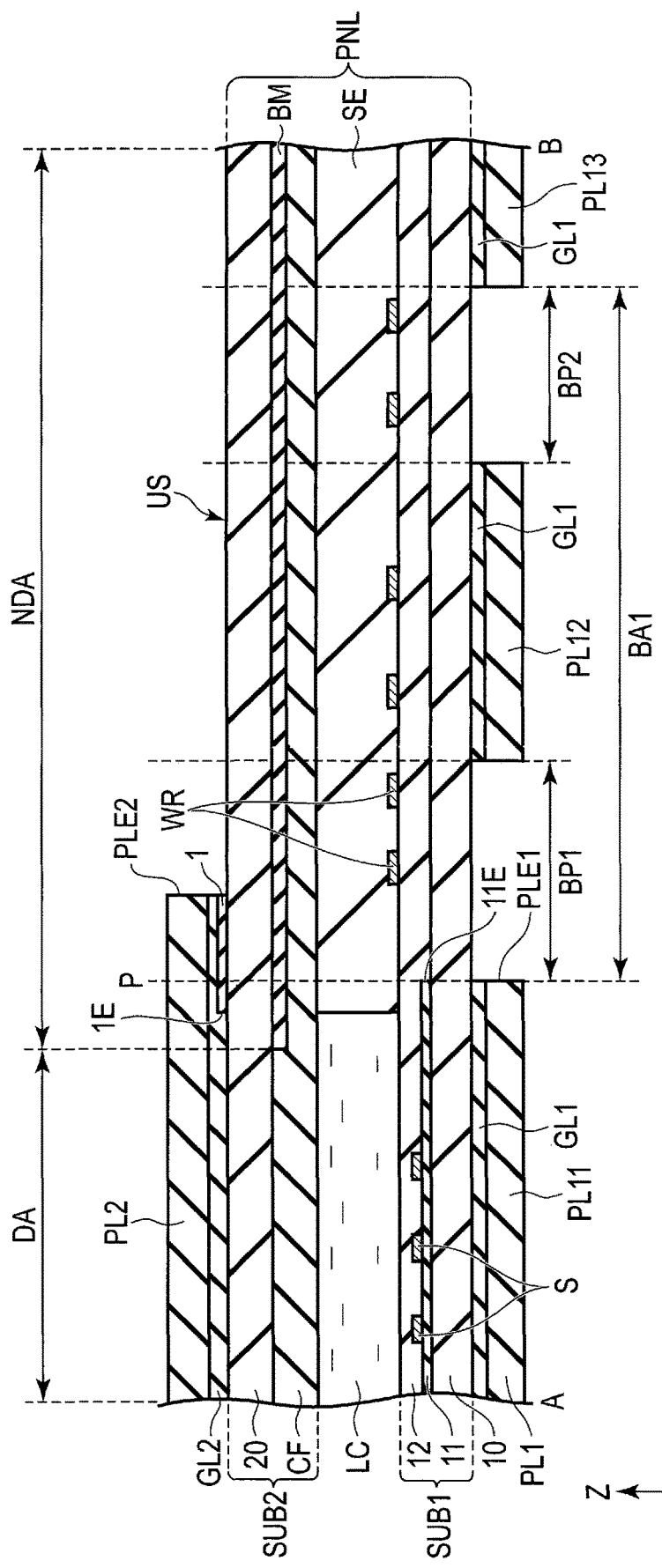
FIG. 3 is a cross section of the display panel taken along line A-B shown in FIG. 1.

In general, according to one embodiment, a display device comprises a display panel comprising a display area which displays images, a non-display area surrounding the display area, and a bend area in the non-display area, a first optical film located on the display panel and comprising an end portion which overlaps the bend area, an adhesive layer which adheres the first optical film and the display panel together and a non-adhesive layer located between the first optical film and the display panel, while overlapping the bend area, wherein the non-adhesive layer is in contact with an upper surface of the display panel.

According to another embodiment, a display device comprises a display panel which comprises a display area which displays images, a non-display area surrounding the display area, and a bend area in the non-display area, a first optical film located on the display panel and comprising an end portion which overlaps the bend area, an adhesive layer which adheres the first optical film and the display panel together and a non-adhesive layer located between the first optical film and the display panel while overlapping the bend area, wherein the display panel is bent in the bend area, and an end portion of the first optical film is spaced from the display panel in the bend area.

The embodiments will be described hereinafter with reference to the accompanying drawings. Note that the disclosure is presented for the sake of exemplification, and any modification and variation conceived within the scope and spirit of the invention by a person having ordinary skill in the art are naturally encompassed in the scope of invention of the present application. Moreover, since it describes more clearly, a drawing may be typically expressed about the width of each part, thickness, form, etc., compared with an actual mode, but is an example to the last and does not limit the interpretation of the present invention. In addition, in the specification and drawings, the structural elements, which have functions identical or similar to the functions described in connection with preceding drawings, are denoted by like reference numbers, and an overlapping detailed description thereof is omitted unless otherwise necessary.

First, a liquid crystal display DSP according to this embodiment will now be described in detail. In this embodiment, the case where display device DSP is a liquid crystal display will be described, the display device DSP may be an organic electroluminescent display.

FIG. 1 is a diagram showing a structure and an equivalent circuit of the display device DSP of the embodiment.

For example, a first direction X, a second direction Y and a third direction Z are orthogonal to each other, but they may cross each other at an angle other than 90 degrees. The first direction X and the second direction Y correspond to a direction parallel to a main surface of the substrate which constitutes display device DSP, and the third direction Z correspond to a thickness direction of the display device DSP. In this specification, a direction towards a tip of an arrow indicating the third direction Z is referred to as above (or, simply, up), and a direction opposite from the tip of the arrow is referred to as below (or, simply, down).

The display device DSP comprises a display panel PNL, an IC chip 2 and a flexible printed circuit board 3.

The display panel PNL is a liquid crystal display panel, and comprises a first substrate SUB1, a second substrate SUB2, a liquid crystal layer LC, signal lines S, scanning lines G, switching elements SW, pixel electrodes PE, a common electrode CE and the like. Further, the display panel PNL includes a display area DA in which images are displayed and a non-display area NDA which surrounds the display area DA.

The second substrate SUB2 opposes the first substrate SUB1. The first substrate SUB1 includes a mounting portion MT extending in the first direction X further from the second substrate SUB2. The first substrate SUB1 and the second substrate SUB2 are adhered together a sealing member located (not shown) in the non-display area NDA. The display area DA includes a plurality of pixels PX arranged in a matrix disposed along the first direction X and the second direction Y.

The signal lines S, the scanning lines G, the switching elements SW, the pixel electrodes PE, the common electrode CE and the liquid crystal layer LC are located in the display area DA. The signal lines S each extend along the first direction X and the scanning lines G each extend along the second direction Y. The switching elements SW are each constituted by a thin-film transistor (TFT), for example, and electrically connected to the respective scanning line G and the respective signal line S. The pixel electrodes PE are electrically connected to the switching elements SW, respectively. The pixel electrodes PE each oppose the common electrode CE, and drive the liquid crystal layer LC by an electric field produced between the pixel electrodes PE and the common electrode CE. A storage capacitor CS is formed, for example, between an electrode at the same potential as that of the common electrode CE and an electrode at the same potential as that of the respective pixel electrode PE.

The IC chip 2 and the flexible printed circuit substrate 3 are mounted on the mounting portion MA. The IC chip 2 may be mounted on the flexible printed circuit substrate 3.

The display panel PNL comprises a first edge E1 and a second edge E2, extending along the first direction X, and a third edge E3 and a fourth edge E4 extending along the second direction Y. The first edge E1 opposes the second edge E2 via the display area DA. The third edge E3 opposes the fourth edge E4 via the display area DA. Moreover, the mounting portion MA is located between the display area DA and the fourth edge E4.

The display panel PNL of this embodiment may be transmissive type which comprises a transmissive display function which displays images by selectively transmitting light from a rear surface side of the first substrate SUB1, a reflective type which comprises a reflective display function which displays images by selectively reflecting light from a front surface side of the second substrate SUB2, or a trans-reflective type which comprises the transmissive display function and the reflective display function.

Here, an explanation of the detailed structure of the display panel PNL is omitted here, but the display panel PNL may comprise a structure provided for a display mode which utilizes a lateral electric field along a main surface of the substrate, a display mode which utilizes a vertical electric field along a normal to the main surface of the substrate, a display mode which utilizes an inclined electric field inclined in an oblique direction with respect to the main surface of the substrate, and further a display mode which utilizes the lateral electric field, the vertical electric field and the inclined electric field in an appropriate combination. Here, the main surface of the substrate is a surface parallel to the X-Y plane defined by the first direction X and the second direction Y.

Moreover, the display panel PNL of this embodiment is constituted by a flexible substrate and can be bent. Therefore, by bending the display panel PNL in the non-display area NDA, the frame of the display device DSP can be reduced in size. In the example illustrated, the display panel PNL includes a bend area BA1 in the non-display area NDA on a side of the first edge E1. Further, the display panel PNL includes a bend area BA2 in the non-display area NDA on a side of the second edge E2. That is, in the display panel PNL illustrated, the bend areas BA1 and BA2 are bent such that the first edge E1 and the second edge E2 are located under the display area DA.

Note that in this embodiment, an example in which the first edge E1 side and the second and edge E2 side of the display panel PNL are bent is indicated, but the embodiment is not limited to this. Of the first edge E1, the second edge E2, the third edge E3 and the fourth edge E4, all of the four sides may be bent, or any one side, any two or three sides may be bent. Moreover, in the example illustrated, the display panel PNL is of a rectangular shape whose first edge E1 and second edges E2 are long sides, whereas third edges E3 and fourth edges E4 are short sides, but it may be of a rectangular shape whose first edge E1 and second edge E2 are short sides, whereas third edge E3 and fourth edge E4 are long sides.

FIG. 2 is a cross-section of the display area DA of the display panel PNL shown in FIG. 1. The example illustrated is equivalent to one in which the fringe field switching (FFS) mode, which is one of the display modes which utilizes a lateral electric field, is applied to the display panel PNL.

The first substrate SUB1 comprises an insulating substrate 10, insulating films 11 to 13, signal lines S, a common electrode CE, metallic wiring lines ML, pixel electrodes PE, a first alignment film AL1 and the like. Note that the switching elements, scanning lines, various insulating films interposed therebetween, and the like are omitted from the illustration in the drawing.

The insulating substrate 10 is, for example, flexible resin substrate, and is light-transmissive. The insulating substrate 10 is formed of, for example, polyimide. The insulating film 11 is disposed on the insulating substrate 10. The signal lines S are located on the insulating film 11, and are covered by the insulating film 12. The insulating film 12 is disposed on the insulating film 11 as well.

The common electrode CE is located on the insulating film 12 and is covered by the insulating film 13. The common electrode CE is a transparent electrode formed of a transparent conductive material such as indium tin oxide (ITO) or indium zinc oxide (IZO). The metallic wiring lines ML are located on common electrode CE such as to be in contact with the common electrode CE. The metal lines ML are located directly above the respective signal lines Si. The metallic wiring lines ML may be located between the common electrode CE and the insulating film 12. The insulating film 13 covers the metallic wiring lines ML as well. The pixel electrodes PE are located on the insulating film 13, and are covered by the first alignment film AL1. Further, the pixel electrodes PE each comprise a slit SL at a position opposing to the common electrode CE. The pixel electrodes PE are each a transparent electrode formed of a transparent, electrically conductive material such as ITO or IZO. The first alignment film AL1 is disposed on the insulation film 14 as well.

The insulating films 11 and 13 are each an inorganic insulating films formed from an inorganic insulating material such as a silicon oxide, silicon nitride, and silicon oxynitride, and may be of a single- or multi-layered structure. The insulating film 12 is, for example, an organic insulating film formed from an organic insulating material such as an acrylic resin.

The second substrate SUB2 comprises an insulating substrate 20, light-shielding layers BM, color filters CF, an overcoat layer OC and a second alignment film AL2 etc.

As in the case of the insulating substrate 10, the insulating substrate 20 is, for example, a flexible resin substrate, and is light-transmissive. The insulating substrate 20 is formed of polyimide, for example. The light-shielding layers BM and the color filters CF are located on the second insulating substrate 20 on a side opposing the first substrate SUB1. The light-shielding layers BM each partition each respective pixel and are located directly above the signal lines S, respectively. The color filters CF are disposed at positions opposing the respective pixel electrodes PE, and the color filters CF partially overlap the light-shielding layers BM, respectively. The color filters CF include a red color filter, a green color filter, a blue color filter and the like. The overcoat layer OC covers the color filters CF. The overcoat layer OC is formed from a transparent resin material. The second alignment film AL2 covers the overcoat layer OC. The first alignment film AL1 and the second alignment film AL2 are formed of, for example, a material which exhibits horizontal alignment properties.

The first substrate SUB1 and the second substrate SUB2 described above are disposed such that the first alignment film AL1 and the second alignment film AL2 oppose each other. The first substrate SUB1 and the second substrate SUB2 are adhered together by a sealing member with a predetermined cell gap formed therebetween. A liquid crystal layer LC is held on an inner side surrounded by the sealing member, in the cell gap between the first substrate SUB1 and the second substrate SUB2. The liquid crystal layer LQ contains liquid crystal molecules LM. The liquid crystal layer LC is constituted by a liquid crystal material of a positive type (the dielectric constant anisotropy thereof being positive), or a liquid crystal material of a negative type (the dielectric constant anisotropy thereof being negative). A polarizer (a second optical film) PL1 is located under the display panel PNL such as to overlap the display area DA. The polarizer PL1 is adhered onto the insulating substrate 10 by an adhesive layer GL1. A polarizer (a first optical film) PL2 is located above the display panel PNL such as to overlap the display area DA. The polarizer PL2 is adhered onto the insulating substrate 20 by an adhesive layer GL2.

In the display panel PNL with such a structure as described above, the liquid crystal elements LM are initially aligned along a predetermined direction between the first alignment film AL1 and the second alignment film AL2 in an off state, in which an electric field is not formed between the respective pixel electrode PE and the common electrode CE. In the off state, the light irradiated towards the display panel PNL from an illumination unit BL disposed on a rear surface side of the display panel PNL is absorbed by the polarizers PL1 and PL2, thus creating a dark display. On the other hand, in an on state, in which an electric field is formed between the respective pixel electrode PE and the common electrode CE, the liquid crystal elements LM are aligned along a direction different from the direction of the initial alignment, by the electric field, and the direction of alignment is controlled by the electric field. In the ON state, a portion of the light from the illumination unit BL passes through the polarizers PL1 and PL2, thus creating a bright display.

FIG. 3 is a cross section of the display panel PNL taken along line A-B shown in FIG. 1. In FIG. 3, only the main structure of this embodiment is shown and illustration of other members is omitted. Moreover, FIG. 3 shows only the structure on a bend area BA1 side, but the structure on a bend area BA2 side is similar to that of the bend area BA1 side.

The bend area BA1 includes bend portions BP1 and BP2. As will be described later, the bend portions BP1 and BP2 are equivalent to portions formed to have curvature when the bend area BA1 is bent. In the bend area BA1, a portion most close to the display area DA is set as a bending start point P. The bending start point P is equivalent to a portion where the bend area BA1 starts to bend.

The polarizer PL1 is not disposed in the bend portions BP1 and BP2. The polarizer PL1 includes a first portion PL11, a second portion PL12 and a third portion PL13. The first portion PL11 overlaps the display area DA, and the second portion PL12 and the third portion PL13 overlap the non-display area NDA. The second portion PL12 overlaps the bend area BA1 as well. The third portion PL13 is located on an opposite side to the first portion PL11 with respect to the bend area BA1. The bending portion BP1 is located between the first portion PL11 and the second portion PL12. The bend portion BP2 is located between the second portion PL12 and the third portion PL13. A usable example of the method of manufacturing such a polarizer PL1 is a technique that the polarizer PL1 is attached onto the display panel PNL, and then the portion of the polarizer PL1, which is located in the bend portions BP1 and BP2 is remove by laser cutting.

The first portion PL11 of the polarizer PL1 extends to the bending start point P. More specifically, an end portion PLE1 of the first portion PL11 overlaps the bending start point P. The insulating film 11, which is an inorganic film, is located in the display area DA and extends to the bending start point P. That is, an end portion 11E of the insulating film 11 is located at the bending start point P. The first substrate SUB1 contains peripheral wiring lines WR in the non-display area NDA. The peripheral wiring lines WR are located on the insulating film 12. In the peripheral wiring lines WR, for example, the signal lines S and the scanning lines G of the display area DA are relocated in a layer above the insulating film 12 in the non-display area NDA. Note that the peripheral wiring lines WR may be located in the same layer as that of the signal lines S and the scanning lines G in the non-display area NDA. Moreover, the peripheral wiring lines WR overlap the bend area BA1. In order to prevent the peripheral wiring lines WR from being broken while the bend area BA1 is bent, it is desirable that the inorganic film should not be disposed in the bend area BA1. The sealing member SE is disposed in the position which overlaps the bend area BA1. The light-shielding layers BM are disposed to cover the non-display area NDA.

The polarizer PL2 is disposed in the display area DA to extend to the non-display area NDA. In this embodiment, an end portion PLE of the polarizer PL22 overlaps the bend area BA1. The adhesive layer GL2 adheres the polarizer PL2 and the display panel PNL together. That is, the adhesive layer GL2 is in contact with the insulating substrate 20 and the polarizer PL2.

A non-adhesive layer 1 is located to overlap the bend area BA1 and between the polarizer PL2 and the display panel PNL. In the example illustrated, the non-adhesive layer 1 is located between the insulating substrate 20 and adhesive layer GL2. More specifically, the adhesive layer GL2 is interposed between the non-adhesive layer 1 and the polarizer PL2 in a position overlapping the bend area BA1. The non-adhesive layer 1 is in contact with an upper surface US of the display panel PNL. A width of the non-adhesive layer 1 taken along the second direction Y is less than or equal to a width of, for example, the bend portion BP1 taken along the second direction Y. Moreover, an end portion 1E of the non-adhesive layer 1, which is on a side of the display area DA, is located on a display area DA side with respect to the end portion PLE1 of the polarizer PL1. The non-adhesive layer 1 is formed from, for example, an adhesive whose adhesion degrades by silicone, soot or UV irradiation. In the case where the non-adhesive layer 1 is formed using silicone, after forming the non-adhesive layer 1 on the insulating substrate 20, the polarizer PL2 coated with the adhesive GL2 is adhered on the display panel PNL. Thus, as shown in FIG. 3, the adhesive layer GL2 is interposed between the non-adhesive layer 1 and the polarizer PL2. As will be described later, in the case where the non-adhesive layer 1 is formed using an adhesive those adhesion degrades by UV irradiation, the non-adhesive layer 1 is formed by the laser beam irradiation onto the adhesive layer GL2 from above the display panel PNL, and thus the adhesive layer GL2 is not interposed between the non-adhesive layer 1 and the polarizer PL2.

FIG. 4 is a cross section showing the bend area BA1 of the display panel shown in FIG. 3, when bent.

The bend area BA1 is bent such that the first portion PL11 and the third portion PL13 of the polarizer PL1 face the third direction Z. The illumination unit BL is located between the first portion PL11 and the third portion PL13. The bend portions BP1 and BP2 are deformed to have curvatures when the bend area BA1 is bent. Moreover, between the bend portion BP1 and the bend portion BP2, the display panel PNL does not have curvature. Note that the display panel PNL may have curvature between the bend portion BP1 and the bend portion BP2, but in which case, the second portion PL12 of the polarizer PL1 is not provided. The bending start point P is located in a boundary between the portion which has the curvature of the display panel PNL and the portion which does not have curvature. In this embodiment, the position of the bending start point P is defined by the end portion PLE1 of the polarizer PL1 and the end portion 11E of the insulating film 11. Note that it suffices if the bending start point P is defined by a position which overlaps at least one of the end portions PLE1 and 11E, and that is, the other one of the end portions PLE1 and 11E needs not to be located on the bending start point P.

The end portion PLE2 of the polarizer PL22 is spaced away from the display panel PNL in the bend area BA1. If other words, in the bend area BA1, a space is provided between the non-adhesive layer 1 and the insulating substrate 20. That is, with the non-adhesive layer 1 interposed between the polarizer PL2 and the display panel PNL, the polarizer PL2 does not bend to follow the display panel PNL while the display panel PNL is being bent. In the example illustrated, the adhesion between the adhesive layer GL2 and the non-adhesive layer 1 is greater than the adhesion between the display panel PNL and the non-adhesive layer 1. Therefore, the non-adhesive layer 1 attaches to the adhesive layer GL2 in the bend area BA1. Here, the adhesion between the display panel PNL and the non-adhesive layer 1 should preferably be 500 mN/25 mm or less. Note that the adhesion between the display panel PNL and the non-adhesive layer 1 is defined by the adhesion between the insulating substrate 20 and the non-adhesive layer 1.

In order not to enhance the rigidity of the bend area BA1, the thickness of the display panel PNL in the bend area BA1 should preferably be less. Therefore, it is preferable that the polarizer PL2 should not enter the bend area BA1. However, depending on the attachment accuracy of the polarizer PL2, the polarizer PL2 may overlap the bend area BA1 in some cases as illustrated. If the thickness of the bend area BA1 increases in this way, it may become undesirably difficult to bend. Moreover, the peripheral wiring lines located in the bend area BA1 are protected from being broken by controlling the neutral surface. Note here that if the polarizer PL2 entering the bend area BA1 is adhered onto the insulating substrate 20, the neutral surface moves to create a strong stress in the peripheral wiring lines, which may undesirably result in breaking of lines.

According to this embodiment, the display panel PNL comprises the non-adhesive layer 1 between the polarizer PL2 and the insulating substrate 20 in the position which overlaps the bend area. With this structure, even if the polarizer PL2 enters the bend area BA1, the polarizer PL2 and the insulating substrate 20 do not bond together in the bend area BA1. In this way, it is possible to suppress the polarizer PL2 from bending to follow the display panel PNL when the bend area BA1 is bent. That is, it is possible to suppress the neutral surface of the bend area BA1 from shifting from a desired position, and to suppress the peripheral wiring lines from being broken. Moreover, it is possible to suppress the bend area BA1 from increasing its rigidity, and from becoming difficult to bend. Thus, a decrease in the production yield can be suppressed.

FIG. 5 is a diagram showing a processing step of manufacturing the non-adhesive layer 1. FIG. 5 shows the processing step in the case where the non-adhesive layer 1 is manufactured using soot. FIG. 5, part (a) is a cross section, whereas part (b) is a plan view of the same process as that of part (a). Moreover, the process shown in FIG. 5 is a step of removing the glass substrate GS attached on the display panel PNL after attaching the polarizer PL1.

First, a region where the non-adhesive layer 1 is to be formed is irradiated with laser LL. The region of the insulating substrate 20, where the laser LL is applied, carbonizes to produce soot which gives rises to the non-adhesive layer 1. In the display panel PNL in which the first and second edge E1 and edge E2 sides are bent, the first and second edge E1 and edge E2 sides are linearly irradiated with the laser LL to form the non-adhesive layer 1 as shown in FIG. 5, part (b). Here, by adjusting the focus of the laser LL, the width of the irradiating portion can be changed.

Next, the entire display panel PNL is scanned with laser to remove the glass substrate GS from the insulating substrate 20. Note that if the adhesive layer GL2 of the polarizer PL2 is of a type whose adhesion degrades by UV irradiation, the non-adhesive layer 1 can be formed using the adhesive layer GL2. In this case, after removing the glass substrate GS, the adhesive layer GL2 is attached onto the insulating substrate 20, and then, as shown in FIG. 5, part (a), the linear region is subjected to UV irradiation.

Figure 6:
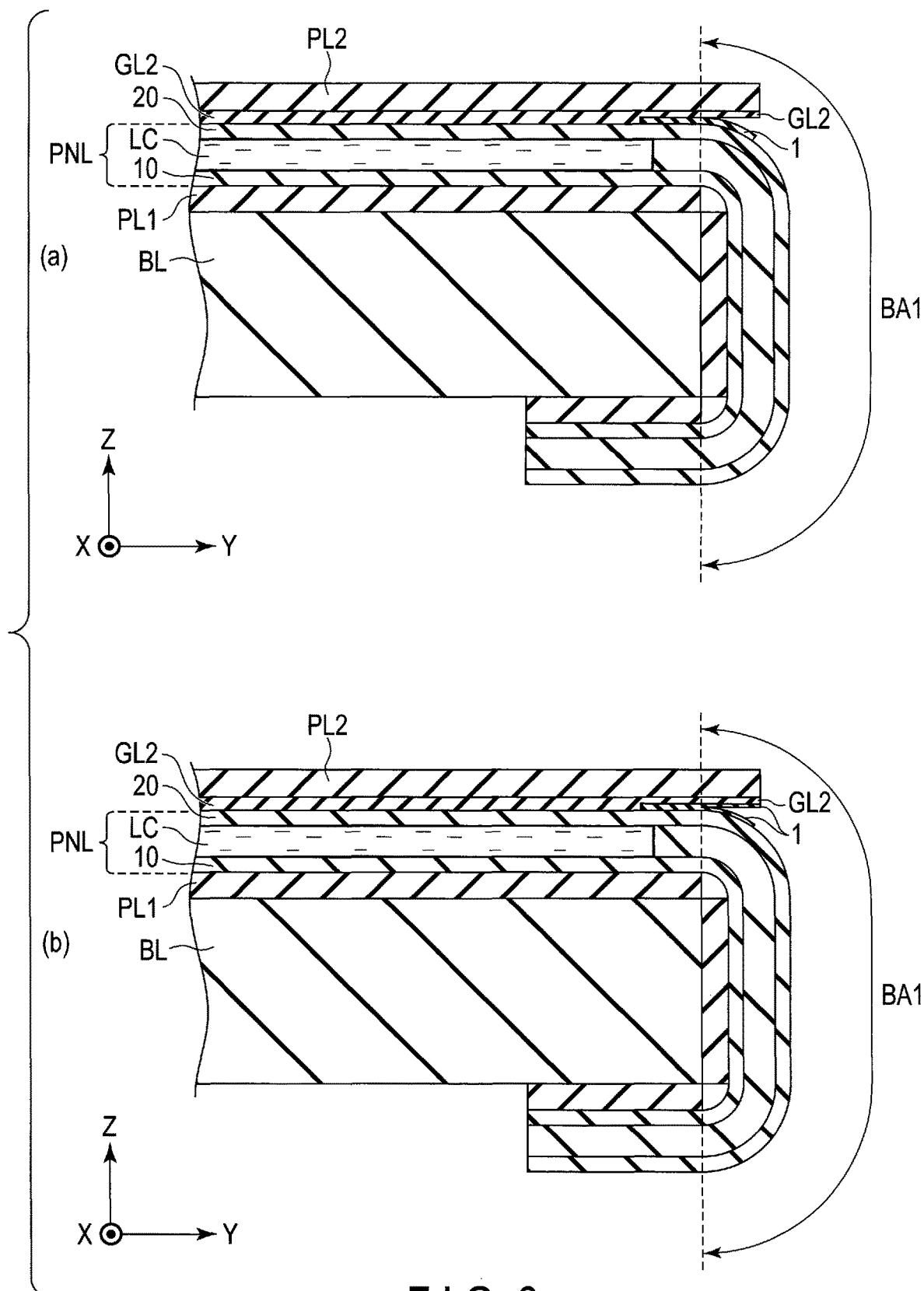
FIG. 6 is a cross section showing a modified example of the non-adhesive layer.

FIG. 6 is a cross section showing a modified example of the non-adhesive layer 1. The structure shown in FIG. 6, part (a) is different from that of FIG. 4 in that the non-adhesive layer 1 is attached to the insulating substrate 20 in the bend area BA1.

In the bend area BA1, a space is interposed between the polarizer PL2 and the display panel PNL. In the example illustrated, the adhesion between the adhesive layer GL2 and the non-adhesive layer 1 is less than the adhesion between the display panel PNL and the non-adhesive layer 1. Therefore, the non-adhesive layer 1 is attached to the display panel PNL in the bend area BA1. Here, the adhesion between the adhesive layer GL2 and the non-adhesive layer 1 should preferably be 500 mN/25 mm or less.

Moreover, the structure shown in FIG. 6, part (b) is different from that of FIG. 4 in that the non-adhesive layer 1 is attached to both the adhesive layer GL2 and the insulating substrate 20 in the bend area BA1. For example, the adhesion between the adhesive layer GL2 and the non-adhesive layer 1 is substantially equal to the adhesion between the display panel PNL and the non-adhesive layer 1.

In this configuration as well, an advantageous effect similar to that explained above can be obtained.

Figure 7:
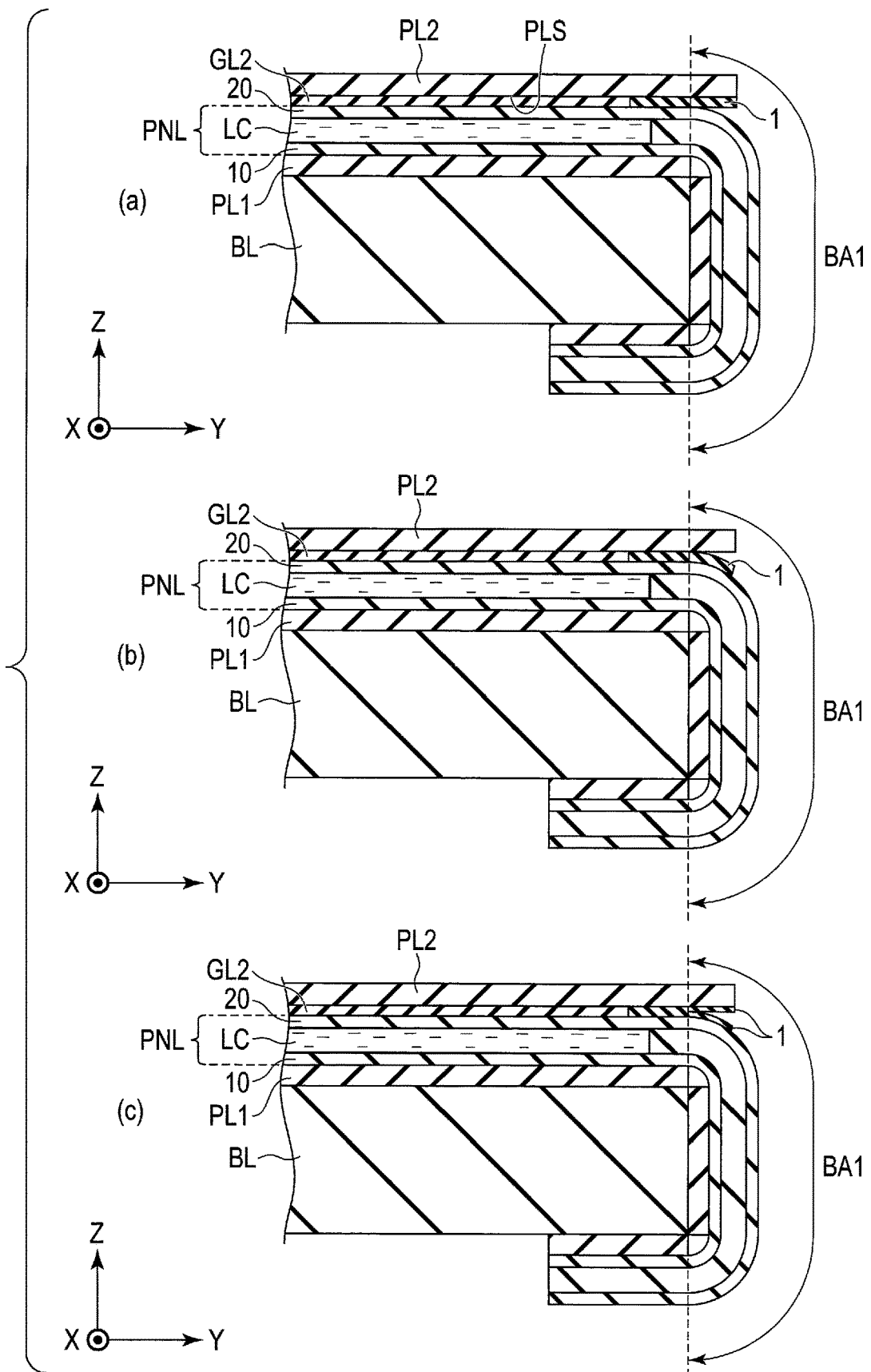
FIG. 7 is a cross section showing a modified example of the non-adhesive layer.

FIG. 7 is a cross section showing another modified example of the non-adhesive layer 1. The structure shown in FIG. 7, part (a) is different from that of FIG. 4 in that adhesive layer GL2 is not interposed between the non-adhesive layer 1 and the polarizer PL2.

A lower surface PLS of the polarizer PL2 is in contact with the non-adhesive layer 1. For example, if the non-adhesive layer 1 is formed from an adhesive material whose adhesion degrades by UV irradiation, the lower surface PLS of the polarizer PL2 is brought into contact with the non-adhesive layer 1 because the non-adhesive layer 1 is formed by UV irradiation carried out from above the display panel PNL. In the example illustrated, the adhesion between the polarizer PL2 and the non-adhesive layer 1 is greater than the adhesion between the display panel PNL and the non-adhesive layer 1. Therefore, the non-adhesive layer 1 is attached to the polarizer PL2 in the bend area BA1. Here, the adhesion between the display panel PNL and the non-adhesive layer 1 should preferably be 500 mN/25 mm or less.

The structure shown in FIG. 7, part (b) is different from that of FIG. 7, part (a) in that the non-adhesive layer 1 is attached to the insulating substrate 20 in the bend area BA1. In the example illustrated, the adhesion between the polarizer PL2 and the non-adhesive layer 1 is less than the adhesion between the display panel PNL and the non-adhesive layer 1. Therefore, the non-adhesive layer 1 is attached to the display panel PNL in the bend area BA1. Here, the adhesion between the polarizer PL2 and the non-adhesive layer 1 should preferably be 500 mN/25 mm or less.

The structure shown in FIG. 7, part (c) is different from that of FIG. 7, part (a) in that the non-adhesive layer 1 is attached to both the polarizer PL2 and the insulating substrate 20 in the bend area BA1. For example, the adhesion between the polarizer PL2 and the non-adhesive layer 1 is substantially equal to the adhesion between the display panel PNL and the non-adhesive layer 1.

In this configuration as well, an advantageous effect similar to that explained above can be obtained.

Note that the embodiment described above is provided in connection with the case where the display device is a liquid crystal display device, but the display device may be an organic electroluminescent display device. In that case, the polarizer PL1 is substituted by a support film or the like, and the polarizer PL2 is substituted by a cover film or the like. Moreover, for example, the illumination unit BL is substituted by a support substrate.

As described above, according to the embodiment, a display device with which a decrease in production yield is suppressible, can be obtained.

Note that an embodiment and modified examples described above are presented for the sake of exemplification, and are not intended to limit the scope of the technology discussed. Such new embodiment can be carried out with other various forms, is the ranges which do not deviate from the summary of invention, and various abbreviations and replacement are performed and it can make a change.

These embodiment and its modification are included in invention indicated to the claim, and its equal range while they are included in the range and summary of invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a display panel comprising a display area which displays images, a non-display area surrounding the display area, and a bend area in the non-display area;
a first optical film located on the display panel and comprising an end portion which overlaps the bend area; and
an adhesive layer and a non-adhesive layer located between the first optical film and the display panel and in contact with an upper surface of the display panel, wherein
the adhesive layer overlaps the display area in a plan view, and adheres the first optical film and the display panel to each other,
the non-adhesive layer overlaps the bend area in the plan view,
the first optical film is not adhered to the display panel in the bend area by the non-adhesive layer and is not bent, and
an end of the first optical film overlaps the bend area in the plan view.

2. The display device of claim 1, wherein
the non-adhesive layer is a part of the adhesive layer, and
the non-adhesive layer is between the adhesive layer and the display panel in the bend area.

3. The display device of claim 1, wherein the non-adhesive layer is made of silicone and soot.

4. The display device of claim 1, wherein an adhesion between the adhesive layer and the non-adhesive layer is greater than an adhesion between the display panel and the non-adhesive layer.

5. The display device of claim 1, wherein an adhesion between the adhesive layer and the non-adhesive layer is less than an adhesion between the display panel and the non-adhesive layer.

6. The display device of claim 1, wherein a lower surface of the first optical film is in contact with the non-adhesive layer.

7. The display device of claim 1, further comprising:
a second optical film located under the display panel and overlapping the display area, wherein
the bend area includes a bending start point on a side of the display area, and
an end portion of the second optical film overlaps the bending start point.

8. The display device of claim 1, wherein
the display panel further comprises an inorganic film located in the display area,
the bend area includes a bending start point on a side of the display area, and
an end portion of the inorganic film is located at the bending start point.

9. A display device comprising:
a display panel which comprises a display area which displays images, a non-display area surrounding the display area, and a bend area in the non-display area;
a first optical film located on the display panel and comprising an end portion which overlaps the bend area; and
an adhesive layer and a non-adhesive layer located between which adheres the first optical film and the display panel, wherein
the display panel is bent in the bend area,
the adhesive layer overlaps the display area in a plan view, and adheres the first optical film and the display panel to each other, the non-adhesive layer overlaps the bend area in the plan view, the first optical film is not adhered to the display panel in the bend area by the non-adhesive layer and is not bent, and an end portion of the first optical film is spaced from the display panel in the bend area.

10. The display device of claim 9, wherein the non-adhesive layer has a portion that is in contact with the adhesive layer in the bend area.

11. The display device of claim 9, wherein the non-adhesive layer is made of silicone and soot.

12. The display device of claim 9, wherein the non-adhesive layer is attached to the first optical film in the bend area.

13. The display device of claim 9, wherein the display panel comprises an insulating substrate in contact with the adhesive layer, and the non-adhesive layer is attached to the insulating substrate in the bend area.

14. The display device of claim 9, further comprising:

a second optical film located under the display panel and overlapping the display area, wherein the bend area includes a bending start point on a side of the display area, and an end portion of the second optical film overlaps the bending start point.

15. The display device of claim 9, wherein the display panel further comprises an inorganic film located in the display area, the bend area includes a bending start point on a side of the display area, and an end portion of the inorganic film is located at the bending start point.

* * * * *